United States Patent
Reeves et al.

(10) Patent No.: US 7,725,478 B2
(45) Date of Patent: May 25, 2010

(54) LOCALIZATION OF CIM-BASED INSTRUMENTATION

(75) Inventors: Drue Reeves, Round Rock, TX (US); Gaurav Chawla, Austin, TX (US); Eugene E. Ruth, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 826 days.

(21) Appl. No.: 11/462,131

(22) Filed: Aug. 3, 2006

(65) Prior Publication Data

US 2008/0040376 A1 Feb. 14, 2008

(51) Int. Cl.
*G06F 17/30* (2006.01)
(52) U.S. Cl. .................. 707/758; 707/956; 709/223
(58) Field of Classification Search .......... 707/705, 707/758, 781, 782, 709, 792, 793, 796
See application file for complete search history.

(56) References Cited

U.S. PATENT DOCUMENTS

| | | | |
|---|---|---|---|
| 2003/0182632 A1* | 9/2003 | Murdock et al. ......... 715/536 |
| 2004/0255223 A1 | 12/2004 | Chawla .................. 714/763 |
| 2005/0171953 A1* | 8/2005 | Bonilla et al. ............ 707/10 |
| 2005/0251562 A1* | 11/2005 | Hauduc et al. ........... 709/217 |
| 2006/0041782 A1 | 2/2006 | Ali et al. .................... 714/6 |
| 2006/0041793 A1 | 2/2006 | Cherian et al. ........... 714/47 |
| 2006/0143502 A1 | 6/2006 | Chawla et al. ............. 714/6 |
| 2006/0156055 A1 | 7/2006 | Cherian et al. ............. 714/4 |
| 2006/0218436 A1 | 9/2006 | Cherian et al. ............. 714/6 |
| 2006/0265508 A1* | 11/2006 | Angel et al. ............. 709/230 |
| 2008/0005305 A1* | 1/2008 | Hass et al. ............... 709/223 |

OTHER PUBLICATIONS

Server Management Working Group, "Modular System Profile", Jun. 26, 2006, Distributed Management Task Force, Inc., pp. 32.*
Tunstall et al., "Developing WMI Solutions: A Guide to Windows Management Instrumentation", Nov. 12, 2002, Addison-Wesley Professional, 191 selected pages.*

* cited by examiner

*Primary Examiner*—Shahid A Alam
*Assistant Examiner*—James E. Richardson
(74) *Attorney, Agent, or Firm*—Hamilton & Terrile, LLP; Gary W. Hamilton

(57) ABSTRACT

A system and method are disclosed for Common Information Model (CIM) management clients to predetermine a data provider's support for localization, select an available locale implementation, and receive the provider's indications and responses in the selected locale. A registered locale class is added to the CIM schema for instantiating predetermined locales within an Interop namespace and a referenced locale class is added to associate registered locale class instances to a registered profile class. Instances of the registered locale class are created by a CIM data provider in the Interop namespace for each supported locale. Element Conforms To Profile (ECTP) association classes are then implemented to create associations between registered locale classes with top level scoping classes and their corresponding locale namespace. The top level scoping class comprising its associated locale namespace is then established as the locale implemented by the data provider.

20 Claims, 4 Drawing Sheets

LOCALIZATION OF CIM-BASED INSTRUMENTATION

BACKGROUND OF THE INVENTION

1. Field of the Invention

The present invention relates in general to the field of information handling systems and more specifically, to systems management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems continue to grow in power, capabilities and variety, and with the advent of the Internet, they have also become more numerous and more distributed. As a result, their management has become increasingly complex, in part due to the growing heterogeneity of the elements that comprise them and the diversity of their associated management environments. In response, the Distributed Management Task Force (DMTF) has developed frameworks that facilitate the interoperable exchange of management information between managed elements and corresponding management systems. One of these frameworks is the Common Information Model (CIM), which provides a consistent definition and structure of management information through the use of object-oriented techniques. As a conceptual information model, the CIM is structured such that managed environments can be viewed as collections of interrelated systems, each of which is comprised of a number of discrete elements.

The CIM, comprised of a specification and a schema, allows management-related information about these elements to be transparently exchanged between management systems. The specification describes an object-oriented meta model based on the Unified Modeling Language (UML) and defines how the CIM can be integrated with other management models. These include, but are not limited to, Simple Network Management Protocol (SNMP) Management Information Base (MIB) or DMTF Management Information Format (MIF). The CIM schema provides a set of classes with properties, methods and associations that define how managed elements in an environment are represented as a common set of objects. In the CIM model, managed objects such as processors, sensors and fans are presented as CIM classes, with the relationships between these managed objects presented through association classes. This hierarchical, object-oriented architecture facilitates the tracking and depiction of the often complex interdependencies and associations between managed objects.

CIM-based management allows a client to manage devices on a network by communicating with data providers, which in turn communicate with managed objects to access data and event notifications. These providers are assigned to serve classes within a namespace, which is a directory-like structure that allows for the organization of classes in a more hierarchical structure. However, localization capabilities of these CIM data providers are limited. For example, there is currently no predetermined way for a provider to determine locale information (e.g., language, units of measure, etc.) of a CIM client making a request and return their responses implementing the same localization preferences. Furthermore, there is currently no predetermined way for a CIM client to communicate its localization preferences to a provider. As a result, the provider returns management information in its default locale implementation. Current approaches to addressing this issue include instantiations of the CIM_LocalizationCapabilities class by providers, which indicate to a CIM client which locales the provider can support for management information input and output. However, this approach does not provide the CIM client with a means of specifying its localization preferences to the provider, nor does it address supporting a plurality of CIM clients that have different localization requirements. These limitations result in the CIM client being required to translate indications, event information and instance property values from the provider's implemented locale settings. In view of the foregoing, there is a need for data providers to provide improved localization support for CIM clients.

SUMMARY OF THE INVENTION

In accordance with the present invention, a system and method is disclosed for Common Information Model (CIM) management clients to predetermine a data provider's support for localization, select an available locale implementation, and receive the provider's indications and responses in the selected locale. In various embodiments of the invention, two new classes are added to the CIM schema. A class, e.g., RegisteredLocale, is added for instantiating predetermined locales within a predetermined Interop namespace, and a class, e.g., ReferencedLocale, is added to associate locale class instances to a Profile Registration class, e.g., RegisteredProfile. Instances of the Locale class are created by a CIM data provider in the interop namespace for each locale (e.g., language, units of measure, etc.) supported by the provider. In various embodiments of the invention, Locale class instances may be derived from a Profile registration class and add a new property named 'locale.' The locale property is composed with a language code, as specified in ISO369, a country code, as specified in ISO3166, and a variant substring, which is vendor-specific.

The provider likewise creates associations between antecedent RegisteredProfile class instances and dependent instances of RegisteredLocale classes for different locales by implementing ReferencedLocale association class instances. In addition, the provider creates locale namespace instances (e.g., LocaleNamespace: . . . \LanguageXYZ) for each locale it supports. The data provider likewise implements a conforming association classes, e.g., ElementConformsToProfile (ECTP), to create associations respectively with top level scoping class (e.g., ComputerSystem:French) in their corresponding locale namespace (e.g., Locale Namespace: . . . \French) and Registered locale class in the predetermined Interop namespace. As a result, the top level scoping class comprising its associated LocaleNamespace is established as the locale implemented by the data provider when responding to CIM client requests.

In one embodiment of the invention, the data provider provides backwards compatibility by implementing an ECTP association class to create an association between a RegisteredProfile instance in the predetermined interoperability namespace and a predetermined top level scoping class (e.g., ComputerSystem:English). Consequently, the predetermined top level scoping class is established as the default locale for the data provider's response to requests from the CIM client. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method for Common Information Model (CIM) management clients to predetermine a data provider's support for localization, select an available locale implementation, and receive the provider's indications and responses in the selected locale. In various embodiments of the invention, a RegisteredLocale class is added to the CIM schema for instantiating predetermined locales within an Interop namespace, and a ReferencedLocale class is added to associate RegisteredLocale class instances to a RegisteredProfile instance. Instances of the RegisteredLocale class are created by a CIM data provider in the Interop namespace for each locale (e.g., language, units of measure, etc.) supported by the provider. ElementConformsToProfile (ECTP) association classes are implemented to create associations between RegisteredLocale classes with top level scoping classes contained in a corresponding LocaleNamespace. As a result, the top level scoping class comprising its associated LocaleNamespace is established as the locale implemented by the data provider. In one embodiment of the invention, backwards compatibility is provided by the data provider implementing an ECTP association between a RegisteredProfile instance in the Interop namespace and a predetermined top level scoping class in a predetermined LocaleNamespace.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
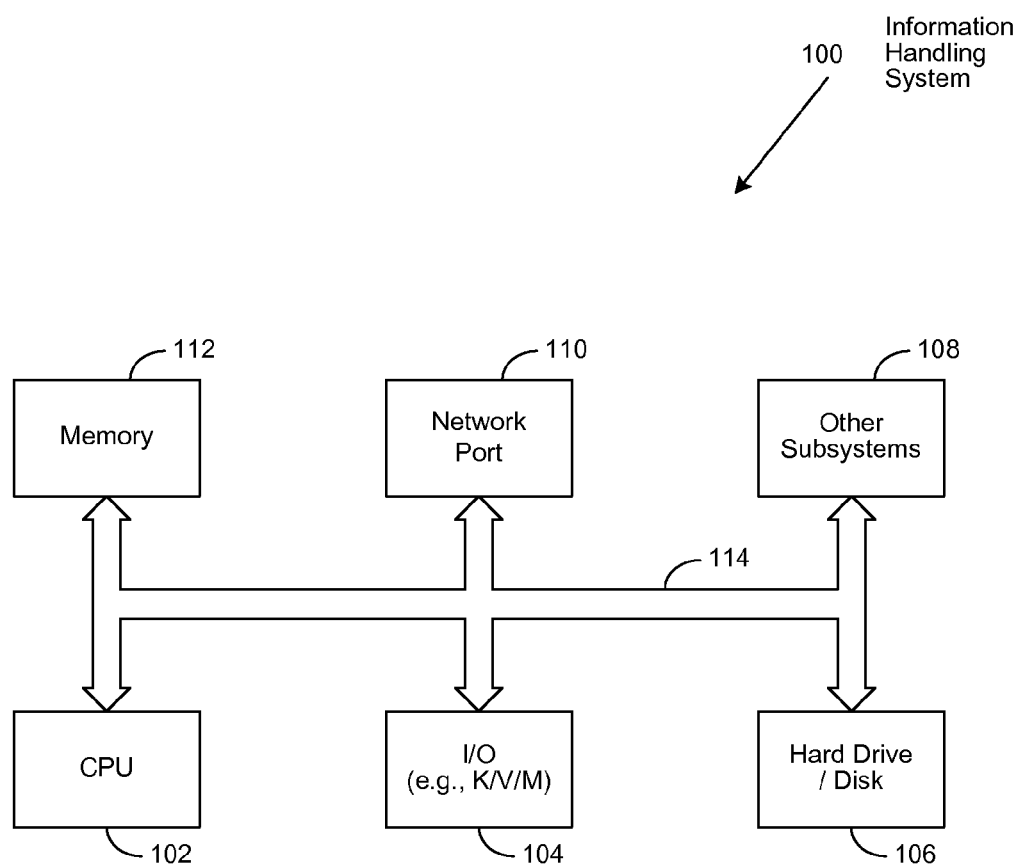
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110, and system memory 112, all interconnected via one or more buses 114.

Figure 2:
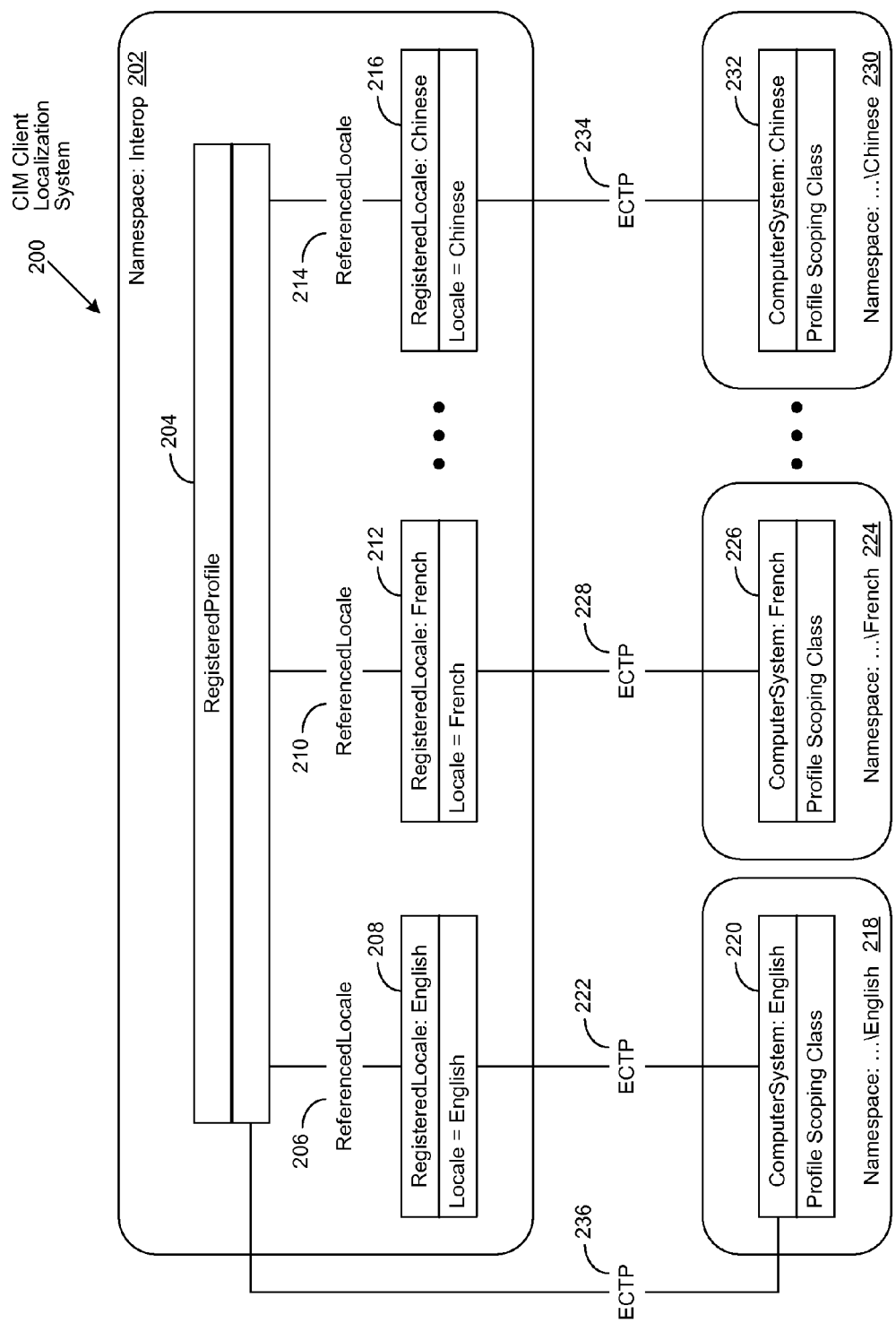
FIG. 2 is a generalized class diagram of a Common Information Model (CIM) management client localization system as implemented in accordance with one embodiment of the invention.

FIG. 2 is a generalized class diagram of a Common Information Model (CIM) management client localization system 200 as implemented in accordance with one embodiment of the invention. In various embodiments of the invention, two new classes are added to the CIM schema. The RegisteredLocale class is added for instantiating predetermined locales within an Interop namespace, and the ReferencedLocale class is added to associate RegisteredLocale class instances to a RegisteredProfile class instance. For example, in one embodiment of the invention, instances of RegisteredLocale class 208, 212, 216 are created by a CIM data provider in Interop namespace 202 for each locale (e.g., language, units of measure, etc.) supported by the provider. RegisteredLocale class instances 208, 212, 216 are derived from RegisteredProfile class 204 and add a new property named 'locale.' The locale entry comprises three substrings, the first substring is the language code, as specified in ISO369, the second substring is the country code, as specified in ISO3166, and the third substring is a variant, which is vendor-specific.

The provider likewise creates associations between antecedent RegisteredProfile class 204 instance and dependent instances RegisteredLocale:English class 208 for English, RegisteredLocale:French 212 for French, and RegisteredLocale:Chinese 216 for Chinese by respectively implementing ReferencedLocale association class 206, 210 and 214. In addition, the provider creates Locale Namespace: . . . \English 218, Locale Namespace: . . . \French 224, and Locale Namespace: . . . \Chinese 230, for each locale (e.g., language, units of measure, etc.) it supports. The data provider likewise implements ElementConformsToProfile (ECTP) association classes 222, 228, 234 to create associations respectively with top level scoping classes ComputerSystem:English 220, ComputerSystem:French 226, and ComputerSystem:Chinese 232, which respectively reside in Locale Namespace: . . . \English 218, Locale Namespace: . . . \French 224, and Locale Namespace: . . . \Chinese 230. For backwards compatibility, the data provider implements ECTP association 236 to create an association between RegisteredProfile instance 204 in Interop namespace 202 and top level scoping class ComputerSystem:English 220, comprising Locale Namespace: . . . \English 218. As a result, top level scoping class ComputerSystem:English 220, comprising Locale Namespace: . . . \English 218 is established as the default locale for the data provider.

Figure 3:
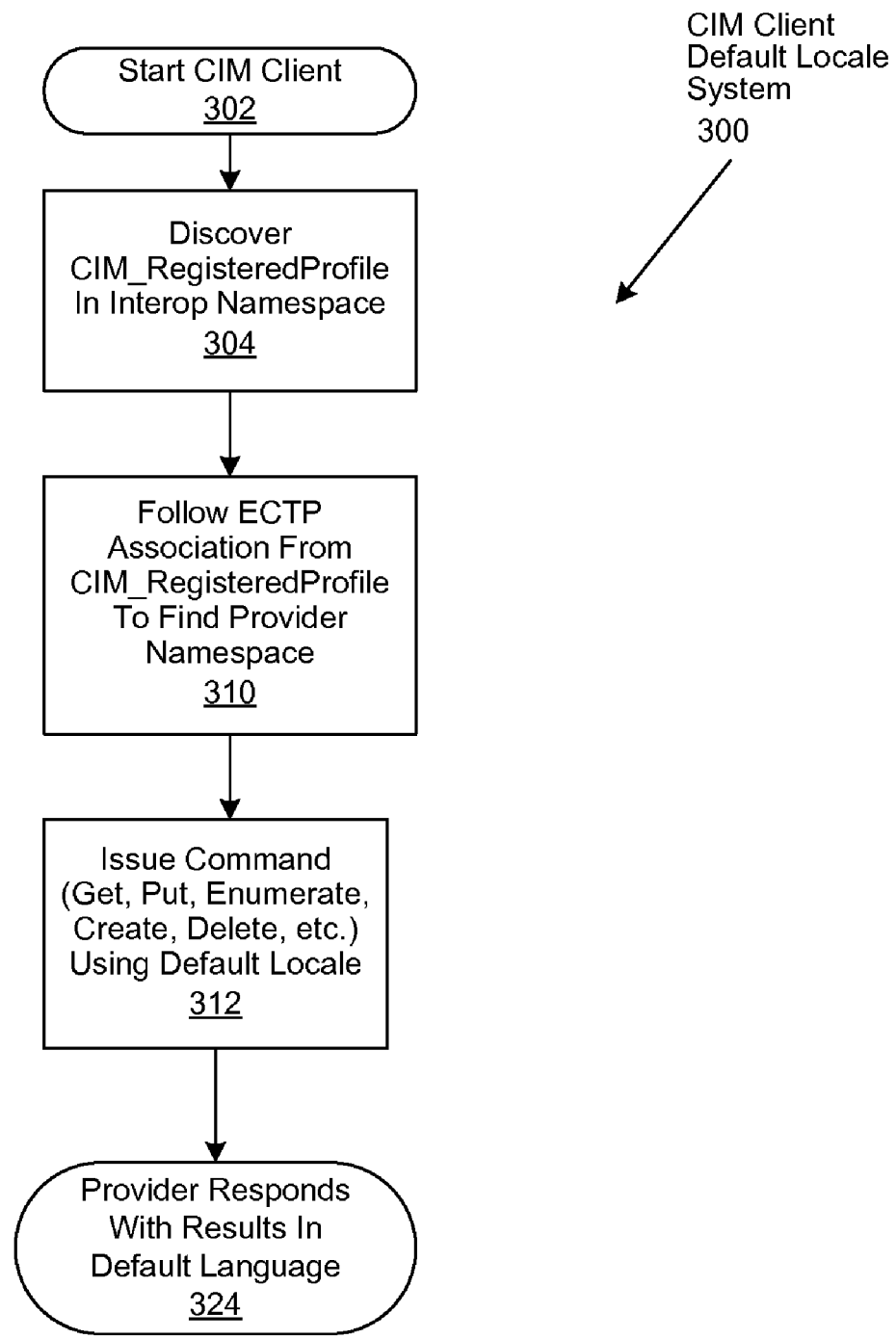
FIG. 3 is a prior art flow chart of a CIM client default locale system 300 as commonly implemented.

FIG. 3 is a prior art flow chart of a CIM client default locale system 300 as commonly implemented. In step 302, the CIM client is initiated to discover RegisteredProfile classes in the interop namespace in step 304. Once discovered, the ElementConformsToProfile (ECTP) association class is followed in step 310 to the RegisteredProfile instance, which returns the default locale (e.g., English). In step 312, the client issues a CIM request (e.g., Get, Put, Enumerate, Create, Delete, etc.) to a predetermined data provider associated with the discovered namespace. In step 324, the associated provider receives the request from the CIM client and responds using its default locale settings. It will be apparent to those of skill in the art that the associated data provider will similarly provide indications, which are representations of a management event-of-interest, using its default locale settings.

Figure 4:
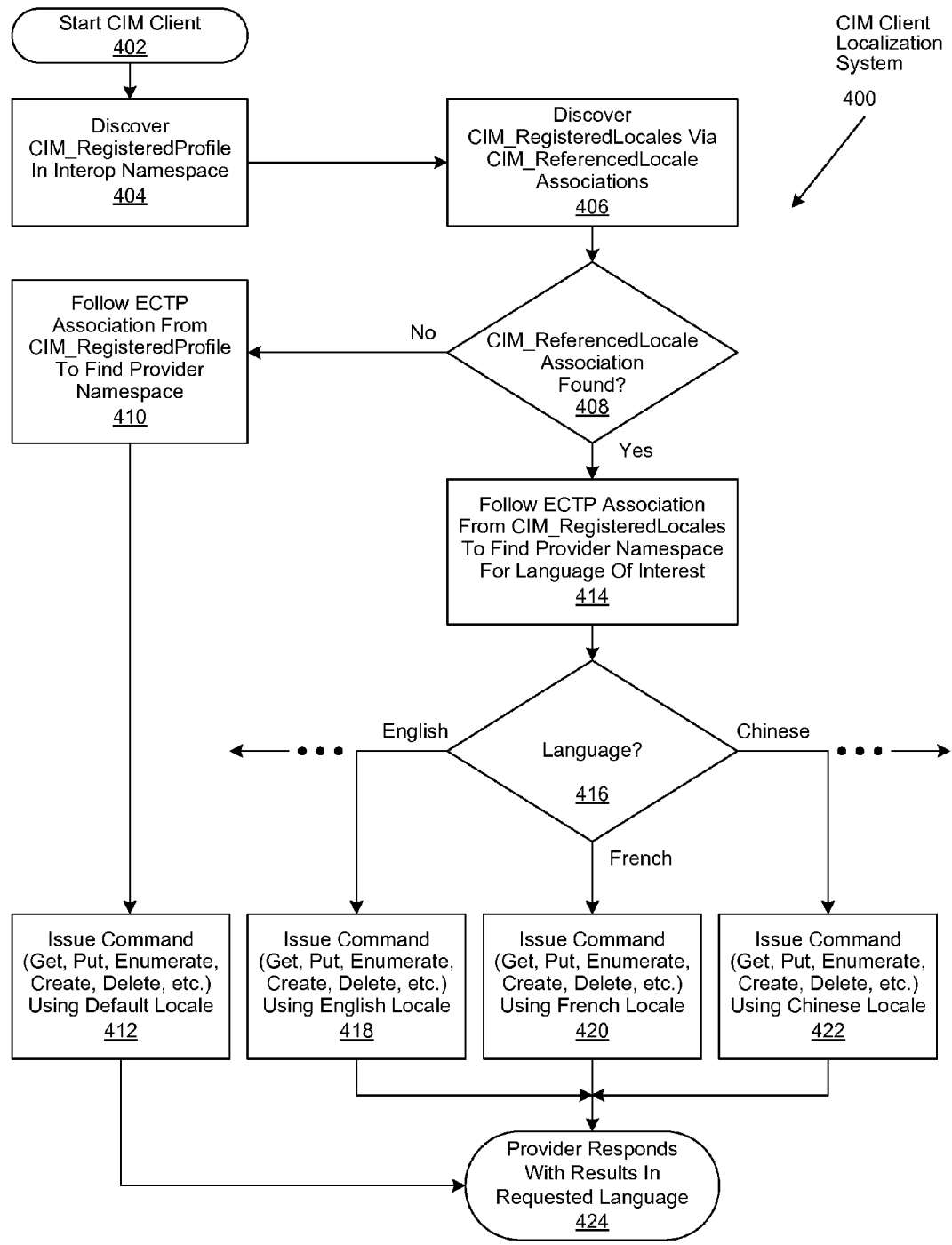
FIG. 4 is a generalized flowchart illustrating a CIM client localization system 400 as implemented in accordance with one embodiment of the invention.

FIG. 4 is a generalized flowchart illustrating a CIM client localization system 400 as implemented in accordance with one embodiment of the invention. In step 402, the CIM client is initiated to discover RegisteredProfile classes in the interop namespace in step 404. Once discovered, the ElementConformsToProfile (ECTP) association class is followed in step 410 to the RegisteredProfile instance, which returns the default locale (e.g., English). Instances of RegisteredLocale classes supported by a predetermined data provider are then discovered in step 406 through ReferencedLocale associations as described in greater detail hereinabove. If no instances of RegisteredLocale classes are discovered in step 408, then backwards compatibility is maintained in step 410 by following the ElementConformsToProfile (ECTP) association class to the RegisteredProfile instance, which returns the default locale (e.g., English). In step 412, the client issues a CIM request (e.g., Get, Put, Enumerate, Create, Delete, etc.) to a predetermined data provider associated with the discovered LocaleNamespace. In step 424, the associated provider receives the request from the CIM client and responds using its default locale settings.

Otherwise, LocaleNamespaces for each locale supported by the provider are discovered in step 414 by following each instance of an ECTP association from its corresponding CIM_ RegisteredLocale instance. Once all LocaleNamespaces have been discovered, the CIM client selects its preferred, supported locale in step 416. For example, if English is the selected locale, then the client issues its CIM request (Get, Put, Enumerate, Create, Delete, etc.) using the English LocaleNamespace in step 418, or the French LocaleNamespace in step 420 for French, or the Chinese LocaleNamespace for Chinese in step 420. In step 420, the provider receives the request and responds using the locale settings corresponding to the LocaleNamespace selected by the CIM client. It will be apparent to those of skill in the art that the data provider will similarly provide indications, which are representations of a management event-of-interest, using the locale settings corresponding to the LocaleNamespace selected by the CIM client. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. An information handling system, comprising:
a plurality of managed elements coupled to said system;
a common information model (CIM) data provider comprising a processor operable to generate:
registered locale classes in said plurality of managed elements, wherein said registered locale classes are used to instantiate a predetermined locale;
referenced locale classes used to associate individual registered locale classes with registered profile classes;
locale namespaces operable to support said predetermined locales; and
a CIM management client comprising a processor operable to discover instances of said registered locale classes corresponding to locales supported by said CIM data provider using said referenced locale classes; wherein upon discovery of at least one non-default registered locale class, said CIM management client selects a preferred locale associated with one of said at least one non-default registered locale class and issues a CIM request using the selected preferred locale associated with said non-default registered locale class; and upon failure to discover a non-default registered locale class, said CIM management client issues a CIM request using a default locale.

2. The information handling system of claim 1, wherein said registered locale classes are generated in a CIM Interop namespace.

3. The information handling system of claim 2, wherein said registered locale classes are derived from said registered profile classes.

4. The information handling system of claim 3, wherein said registered locale classes comprise a locale property to indicate languages.

5. The information handling system of claim 1, wherein said referenced locale classes reside in CIM Interop locale namespaces and are used to associate registered profiles with a registered locale.

6. The information handling system of claim 5, wherein said locale namespaces comprise top level scoping classes.

7. The information handling system of claim 6, wherein said top level scoping classes and said registered locale classes are associated with conformance association classes.

8. The information handling system of claim 7, wherein a predetermined top level scoping class is associated to said registered profile class through said conformance association classes to provide backwards compatibility for support of a predetermined default locale.

9. The information handling system of claim 6, wherein said top level scoping class is instantiated in the namespace for each locale by said CIM data provider.

10. The information handling system of claim 1, wherein said CIM management client is operable to select said locales supported by said CIM data provider.

11. A computer-implemented method of using an information handling system to manage a plurality of elements coupled to said information handling system, comprising:
using a common information model (CIM) data provider comprising a processor to generate:
registered locale classes in said plurality of managed elements, wherein said registered locale classes are used to instantiate a predetermined locale;
referenced locale classes used to associate individual registered locale classes with registered profile classes; and locale namespaces operable to support said predetermined locales; and using a processor and a CIM management client executed by said processor to discover instances of said registered locale classes corresponding to locales supported by said CIM data provider using said referenced locale classes; wherein upon discovery of at least one non-default registered locale class, said CIM management client selects a preferred locale associated with one of said at least one non-default registered locale class and issues a CIM request using the selected preferred locale associated with said non-default registered locale class; and upon failure to discover a non-default registered locale class, said CIM management client issues a CIM request using a default locale.

12. The method of claim 11, further comprising:

generating said registered locale classes in a CIM Interop namespace.

13. The method of claim 12, further comprising:

deriving said registered locale classes from said registered profile classes.

14. The method of claim 13, wherein said registered locale classes comprise a locale property to indicate languages.

15. The method of claim 11, wherein said referenced locale classes reside in CIM Interop locale namespaces and are used to associate registered profiles with a registered locale.

16. The method of claim 15, wherein said locale namespaces comprise top level scoping classes.

17. The method of claim 16, wherein said top level scoping class is instantiated in the namespace for each locale by said CIM data provider.

18. The method of claim 16, wherein said top level scoping classes and said registered locale classes are associated with conformance association classes.

19. The method of claim 18, wherein a predetermined top level scoping class is associated to said registered profile class through said conformance association classes to provide backwards compatibility for support of a predetermined default locale.

20. The method of claim 11, wherein said CIM management client is operable to select said locales supported by said CIM data provider.

* * * * *